United States Patent [19]

Mori

[11] Patent Number: 4,766,523
[45] Date of Patent: Aug. 23, 1988

[54] ELECTRIC DOUBLE LAYER CAPACITOR

[75] Inventor: Yoshinori Mori, Takefu, Japan

[73] Assignee: Murata Manufacturing Co., Ltd., Japan

[21] Appl. No.: 48,220

[22] Filed: May 11, 1987

[30] Foreign Application Priority Data

May 27, 1986 [JP] Japan ................................. 61-80377

[51] Int. Cl.$^4$ ............................................. H01G 9/00
[52] U.S. Cl. .................................... 361/433; 29/570.1
[58] Field of Search ............... 361/328, 329, 330, 433; 29/25.42

[56] References Cited

U.S. PATENT DOCUMENTS

| 2,733,389 | 1/1956 | Ellison | 361/433 |
| 3,398,333 | 8/1968 | Zeppieri | 361/433 |
| 4,245,277 | 1/1981 | Van Gils et al. | 361/433 |
| 4,296,186 | 10/1981 | Wolf | 361/433 X |
| 4,298,906 | 11/1981 | Elias | 361/433 |
| 4,488,203 | 12/1984 | Muranaka et al. | 361/433 X |
| 4,542,444 | 9/1985 | Boland | 361/433 |

Primary Examiner—Donald A. Griffin
Attorney, Agent, or Firm—Ostrolenk, Faber, Gerb & Soffen

[57] ABSTRACT

An electric double layer capacitor comprising a cylindrical metal case having an opening at least in a first end and a plurality of electric double layer capacitor elements stacked and received in the metal case. A terminal board is inserted in the said first end of the metal case to close the opening of the metal case. The peripheral edge portion of the opening in the metal case is inwardly crimped to hold the electric double layer capacitor elements and the terminal board in the metal case. A clearance between the crimped portion of the peripheral edge of the opening in the metal case and the terminal board is sealed by a resin member.

13 Claims, 4 Drawing Sheets

ELECTRIC DOUBLE LAYER CAPACITOR

BACKGROUND OF THE INVENTION

1. Field of the Invention

The present invention relates to an electric double layer capacitor, and more particularly, it relates to an improvement in structure of an electric double layer capacitor having a plurality of electric double layer capacitor elements stacked and held in a metal case.

2. Description of the Prior Art

FIG. 2 shows an example of a conventional electric double layer capacitor, which comprises a plurality of electric double layer capacitor elements 2, 3, . . . , 4 received in a cylindrical metal case 1. An opening 1a is defined in one end of the cylindrical metal case 1 hereinafter referred to for convenience as the upper end, and a terminal board 5 is provided in the upper end of the metal case 1 to close the opening 1a. The terminal board 5 comprises a first conductive plate 6 which is in contact with the upper surface of the electric double layer capacitor element 2, an insulating plate 7 having in a lower cavity thereof said first conductive plate 6, and a second conductive plate 8 provided on the upper surface of the insulating plate 7. Outwardly extending lead wires 6a and 8a extend from the conductive plates 6 and 8 respectively.

In the conventional electric double layer capacitor as shown in FIG. 2, the peripheral edge of the opening 1a in the metal case 1 is inwardly crimped to hold the terminal board 5 and the stacked electric double layer capacitor elements 2 . . . 4, which are in close contact with each other, in the metal case 1.

Although not clearly shown in FIG. 2, the second conductive plate 8 is electrically connected to the metal case 1 by solder, for example.

As seen in FIG. 2, the outer surface of the terminal board 5, i.e., the upper surface of the second conductive plate 8, is merely pressed by a crimped portion 1b of the metal case 1. In order to mount the electric double layer capacitor of FIG. 2 on a printed circuit board or the like, the lead wires 6a and 8a are soldered to portions to which the lead wires are to be electrically connected, and the electric double layer capacitor is washed by a solvent after such soldering.

In the structure as shown in FIG. 2, a clearance between the second conductive plate 8 and the crimped portion 1b of the metal case 1 is not necessarily reliably sealed but merely the edge of the metal case 1 is crimped, whereby the solvent employed for washing may enter the interior of the metal case 1 through the clearance between the forward end of the crimped portion 1b and the second conductive plate 8 to cause shorting between the electric double layer capacitor elements 2 . . . 4.

SUMMARY OF THE INVENTION

Accordingly, it is an object of the present invention to provide an electric double layer capacitor which can reliably prevent a washing solution from entering the interior of the same.

The electric double layer capacitor according to the present invention comprises a cylindrical metal case having an opening at least in a first end, a plurality of electric double layer capacitor elements stacked and received in the metal case and a terminal board inserted in the first end of the metal case to close the opening. The peripheral edge portion of the opening in the metal case is inward crimped to hold the electric double layer capacitor elements and the terminal board in the metal case, and it is a feature of the present invention that a clearance defined between a crimped portion of the peripheral edge of the opening in the metal case and the terminal board is sealed by resin.

According to a feature of the present invention, the clearance between the crimped portion of the opening in the metal case and the terminal board is sealed by resin so that, even if the capacitor is washed by a solvent after soldering for mounting the same on a printed circuit board or the like, the solvent will not enter the interior of the metal case, whereby the electric double layer capacitor can be reliably prevented from a defect such as shorting in employment.

These and other objects, features, aspects and advantages of the present invention will become more apparent from the following detailed description of embodiments of the present invention when taken in conjunction with the accompanying drawings.

DESCRIPTION OF THE PREFERRED EMBODIMENTS

Figure 1:
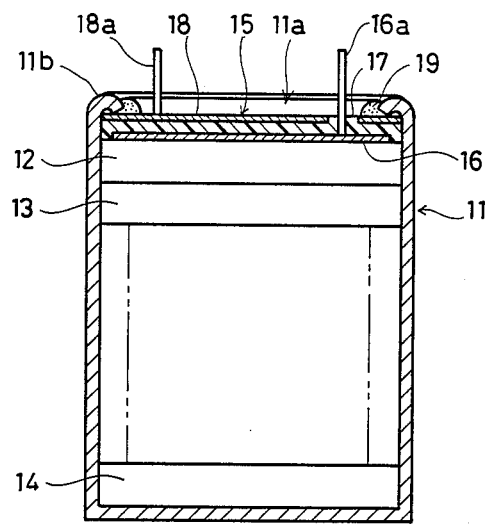
FIG. 1 is a sectional view showing an embodiment of the present invention.
Figure 2:
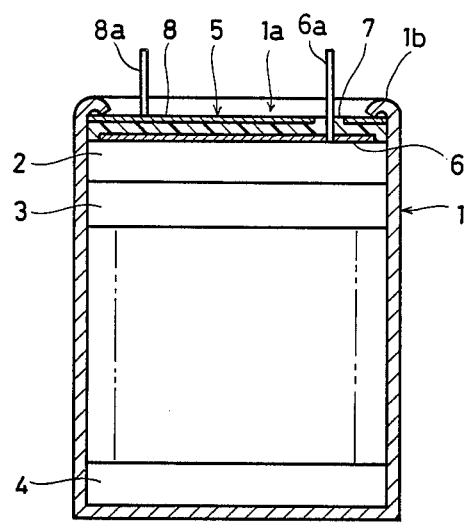
FIG. 2 is a sectional view showing an example of a conventional electric double layer capacitor.

FIG. 1 shows an electric double layer capacitor according to a first embodiment of the present invention, which comprises a metal case 11 and a plurality of electric double layer capacitor elements 12, 13, . . . , 14 stacked and received in the metal case 11. A terminal board 15 is arranged in an opening 11a of the metal case 11. The terminal board 15 has a first conductive plate 16, an insulating plate 17 and a second conductive plate 18 in the same manner as the terminal board 5 of FIG. 2. The conductive plates 16 to 18 are integrally provided with lead wires 16a and 18a respectively, for connection with an external device.

A further feature of this embodiment resides in that a clearance between a crimped portion 11b of the peripheral edge portion of the opening 11a in the metal case 11 and the terminal board 15 is sealed by resin 19.

Figure 3:
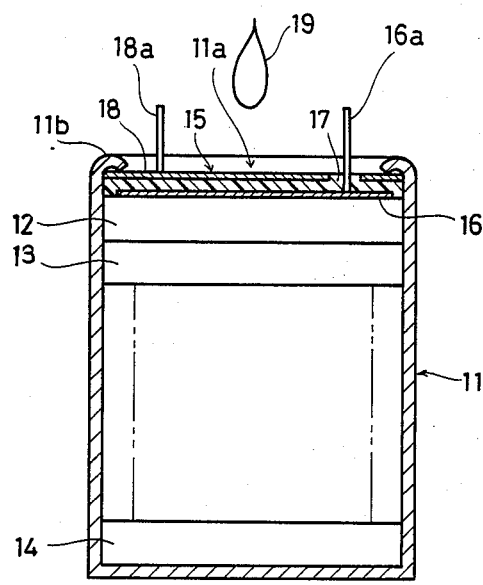
FIG. 3 is a sectional view for illustrating the process for obtaining the embodiment of FIG. 1.

The resin 19 is coated in the form of a ring along the peripheral edge of the opening 11a. In order to coat the resin as such, the upper end of the metal case 11 is crimped as shown in FIG. 3 and then liquid resin 19 is dripped on the terminal board 15 from above. Further, the metal case 11 is rotated about its axis by a spinner for example, thereby to coat the resin 19 in the form of a ring along the peripheral edge of the opening 11a. The resin 19 is then dried and hardened.

Figure 4:
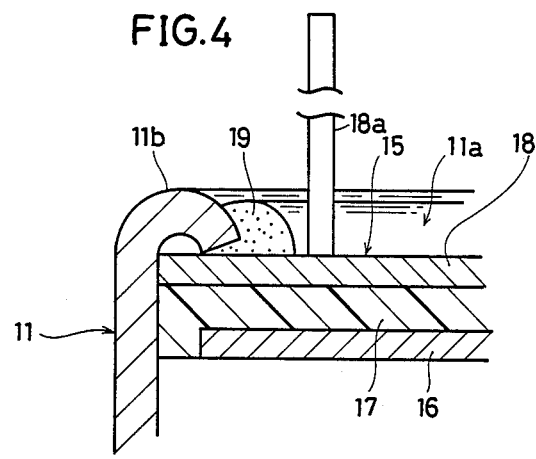
FIG. 4 is an enlarged sectional view showing a principal part of FIG. 1.

As shown in an enlarged view of FIG. 4, the resin 19 thus hardened seals a clearance between the crimped portion 11b of the metal case 11 and the second conductive plate 18 of the terminal board 15. Therefore, even if the electric double layer capacitor of this embodiment is dipped in a washing solution for washing processing after soldering, the washing solution will not enter the metal case 11. Thus, the entire electric double layer capacitor can be dipped in the washing solution for the washing procedure.

Figure 5:
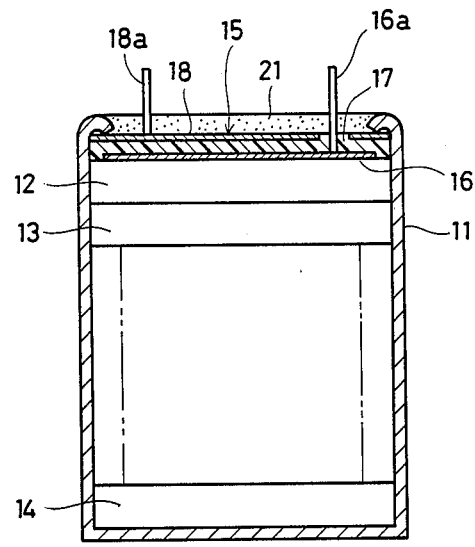
FIG. 5 is a sectional view showing a second embodiment of the present invention.

Referring now to FIG. 5, although the resin 19 is coated in the form of a ring in the embodiment of FIG. 1, resin 21 may be coated and hardened to fill up the entire space in front of the terminal board 15, i.e., to cover the entire exposed portion of the terminal board, 15, as shown in FIG. 5.

Figure 6:
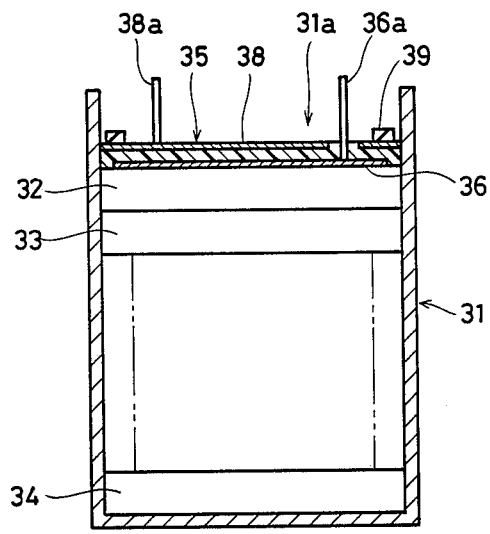
FIG. 6 is a sectional view for illustrating a third embodiment of the present invention, and shows the placement of a ring-shaped resin member on the capacitor.
Figure 7:
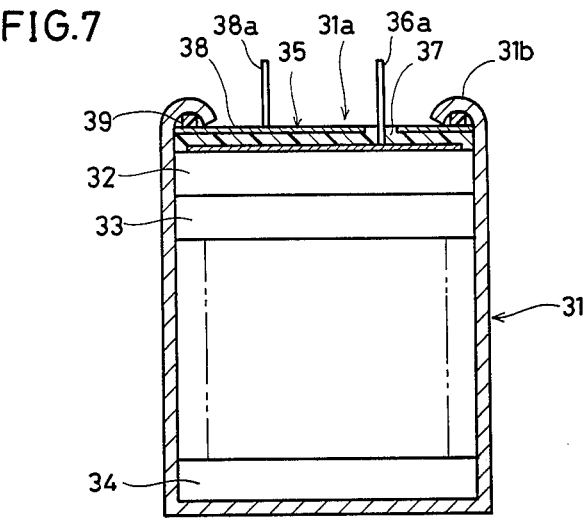
FIG. 7 is a sectional view showing the crimping of the peripheral edge of the opening of the metal case in the third embodiment.
Figure 8:
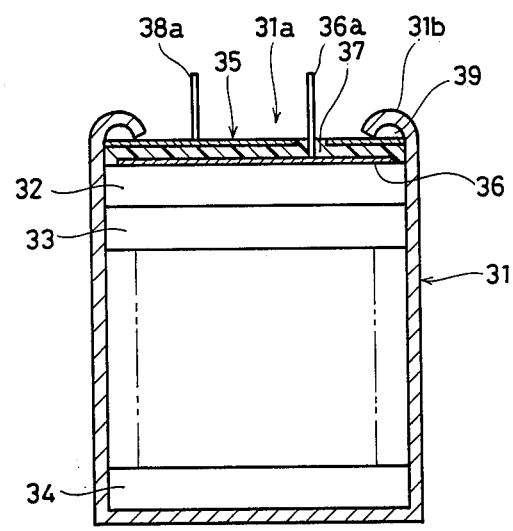
FIG. 8 is a sectional view showing the sealing of a clearance around the crimped edge by molten and hardened resin in the third embodiment.

FIGS. 6 to 8 are sectional views for illustrating still another embodiment of the present invention. A plurality of electric double layer capacitor elements 32, 33, . . . , 34 are received in a metal case 31 having an opening 31a whose periphery is not yet crimped and a terminal board 35 is placed on the same. Then, a ring-shaped resin member 39 is placed on a second conductive plate 38 of the terminal board 35. Then the forward end of the metal case 31 is inwardly crimped to enclose the ring-shaped resin member 39, as shown in FIG. 7.

Then the electric double layer capacitor as shown in FIG. 7 is heated to melt the resin member 39 enclosed by a crimped portion 31b of the metal case 31 so that the resin 39 enters a clearance between the crimped portion 31b and the terminal board 35. Thereafter the electric double layer capacitor is cooled so that the clearance between the crimped portion 31b of the metal case 31 and the terminal board 35 can be sealed by the resin member 39 as shown in FIG. 8.

While the resin 19 or 21 in the embodiment as shown in FIG. 1 or 5 can be prepared from any appropriate synthetic resin, it is necessary to employ a resin which is melted by heating such as polyethylene, polyamide, vinylchloride resin or the like in the embodiment as shown in FIG. 8.

Although embodiments of the present invention have been described and illustrated in detail, it is clearly understood that the same is by way of illustration and example only and is not to be taken by way of limitation, the spirit and scope of the present invention being limited only by the terms of the appended claims.

What is claimed is:

1. A sealed electric double layer capacitor comprising:
   a metal case having an opening at least in a first end thereof;
   a plurality of electric double layer capacitor elements stacked and received in said metal case; and
   a terminal board inserted in said first end of said metal case in said opening to enclose said capacitor elements,
   said metal case having a crimped end portion surrounding said opening which projects radially inwardly and toward said terminal board, thereby holding said electric double layer capacitor elements and said terminal board in said metal case, and defining a clearance between said crimped end portion and said terminal board,
   said terminal board having conductive terminal means on at least one surface thereof for connecting said capacitor elements to external circuits, wherein said conductive terminal means conductively contacts said crimped end portion of said metal case:
   said sealed electric double layer capacitor further comprising a resin member disposed for sealing at least a portion of said clearance between said crimped end portion of said metal case and said terminal board.

2. An electric double layer capacitor in accordance with claim 1, wherein said resin member is disposed for sealing at least a portion of said clearance between a radially inner edge of said crimped end portion of said metal case and said terminal board.

3. An electric double layer capacitor in accordance with claim 2, wherein said resin member is disposed substantially only along said radially inner edge of said crimped end portion of said metal case and an adjacent portion of said terminal board.

4. An electric double layer capacitor in accordance with claim 2, wherein said resin member covers substantially the entire surface of said terminal board radially inward of said radially inner edge of said crimped end portion of said metal case, and thereby closes said opening, and contacts said radially inner edge of said crimped end portion of said metal case.

5. An electric double layer capacitor in accordance with claim 1, wherein said resin member is disposed for sealing substantially all of said clearance between said crimped end portion of said metal case and said terminal board.

6. An electric double layer capacitor in accordance with claim 5, wherein said resin means is a thermoplastic resin member which fills substantially all of said clearance between said crimped end portion of said metal case and said terminal board.

7. An electric double layer capacitor in accordance with claim 1, wherein said metal case is substantially cylindrical.

8. A method of manufacturing a sealed electric double layer capacitor comprising the steps of:
   (a) providing a metal case having an opening at least in a first end thereof;
   (b) stacking a plurality of electric double layer capacitor elements in said metal case;
   (c) then inserting a terminal board in said first end of the metal case in said opening to enclose said capacitor elements, said terminal board having conductive terminal means on at least one surface thereof for connecting said capacitor elements to external circuits;
   (d) crimping an end portion of said metal case surrounding said opening, radially inward toward said terminal board, to hold said terminal board and capacitor elements in said metal case, and to define a clearance between said crimped end portion and said terminal board, wherein said conductive terminal means conductively contacts said crimped end portion of said metal case; and
   (e) applying resin to seal said clearance between said crimped end portion of said metal case and said terminal board.

9. A method as in claim 8, wherein said crimped end portion has a radially inner edge, and wherein said clearance is sealed by applying said resin to said inner terminal board, and to an edge portion of said clearance, said edge portion being defined between said inner edge of said crimped end portion and said terminal board.

10. A method as in claim 9, wherein said resin is applied substantially only to said inner edge of said crimped end portion, and to an adjacent portion of said terminal board.

11. A method as in claim 10, including also applying said resin to substantially all parts of said terminal board radially inward of said crimped end portion.

12. A method as in claim 8, wherein said resin is applied to seal substantially all of said clearance defined between said crimped end portion of said metal case and said terminal board.

13. A method as in claim 12, including:
placing thermoplastic resin along the periphery of said terminal board adjacent said end portion of said metal case before crimping said end portion;
crimping said end portion of said metal case radially inward so as to substantially enclose said resin in said clearance between said crimped end portion and said terminal board;
heating said resin to melt it, thereby substantially filling said clearance with resin and sealing said electrolytic capacitor.

* * * * *